United States Patent [19]

Lowrey et al.

[11] Patent Number: 5,278,873
[45] Date of Patent: Jan. 11, 1994

[54] BROADBAND DIGITAL PHASE ALIGNER

[75] Inventors: Scott W. Lowrey, Gilbert; Jeffrey A. Porter, Tempe, both of Ariz.

[73] Assignee: Motorola, Inc., Schaumburg, Ill.

[21] Appl. No.: 48,706

[22] Filed: Apr. 16, 1993

Related U.S. Application Data

[63] Continuation of Ser. No. 694,175, May 1, 1991, abandoned.

[51] Int. Cl.$^5$ .............................................. H04L 7/02
[52] U.S. Cl. ........................................ 375/118; 328/55
[58] Field of Search ................ 375/118, 119; 307/510, 307/514; 328/109, 55, 110, 155, 133

[56] References Cited

U.S. PATENT DOCUMENTS

| 4,756,011 | 7/1988 | Cordell | 375/118 |
| 4,821,296 | 4/1989 | Cordell | 375/118 |
| 4,841,551 | 6/1989 | Avaneas | 375/118 |
| 4,949,361 | 8/1990 | Jackson | 375/118 |

FOREIGN PATENT DOCUMENTS

0168330  1/1986  France .

OTHER PUBLICATIONS

"A 45-Mbit/s CMOS VLSI Digital Phase Aligner", by Rober R. Cordell, IEEE Journal of Solid-State Circuit, vol. 23, No. 2, Apr. 1988 pp. 323-328.

Primary Examiner—Curtis Kuntz
Assistant Examiner—Tesfaldet Bocure
Attorney, Agent, or Firm—Frederick M. Fliegel; Robert M. Handy

[57] ABSTRACT

Automatic dynamic phase alignment of digital data, skewed with respect to a local clock, is obtained over a wide range of skew and skew frequencies. The system includes (i) an edge detector (52) containing predetermined delays (e.g., D1, D2, D3), (ii) delay registers (e.g., 72, 76, 84, 86), and (iii) a controller (54) for deciding when un-delayed and delayed data D0, D1, D2, D3 have transitions (102-138) which bracket corresponding clock transitions (100, 110, 120, 130) and regulating a subsequent two-stream parallel (e.g., bi-phase) register-multiplexer (56). The controller selects from the register-multiplexer (56), whichever of in-phase data D or delayed data DD has its transition spaced away from the clock transition by at least one delay D1, D2, or D3.

21 Claims, 3 Drawing Sheets

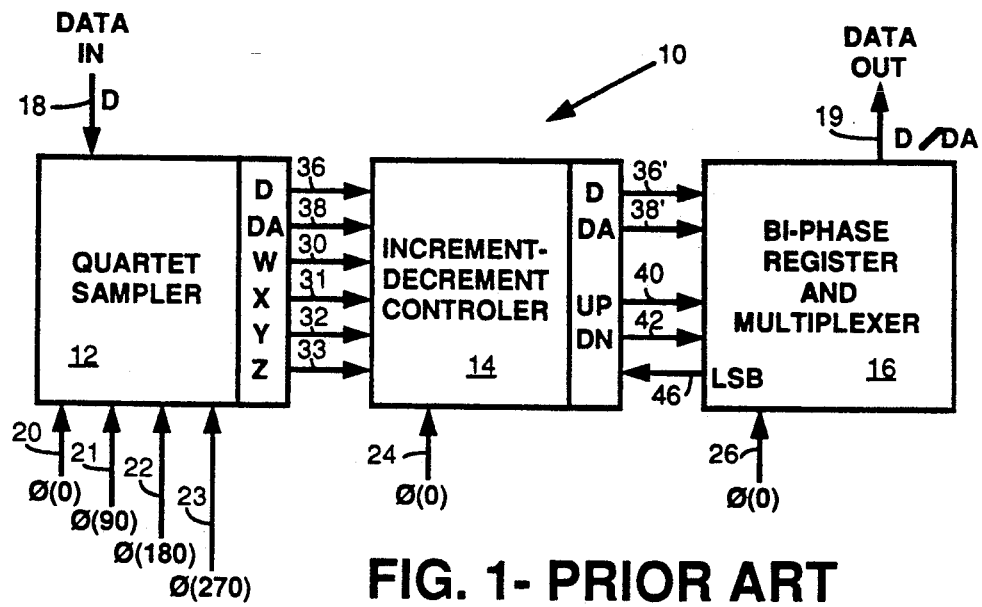
FIG. 1- PRIOR ART
| DIS-AGREEMENT TYPE | CURRENT DATA STATE | LSB | ACTION NEEDED |
|---|---|---|---|
| W | D | 1 | INCREMENT - SELECT EARLIER DATA |
| W | DA | 0 | NO ACTION |
| X | D | 1 | NO ACTION |
| X | DA | 0 | DECREMENT - SELECT LATER DATA |
| Y | D | 1 | NO ACTION |
| Y | DA | 0 | INCREMENT - SELECT EARLIER DATA |
| Z | D | 1 | DECREMENT - SELECT LATER DATA |
| Z | DA | 0 | NO ACTION |
FIG. 2 - PRIOR ART

5,278,873

BROADBAND DIGITAL PHASE ALIGNER

This application is a continuation of prior application Ser. No. 07/694,175, filed May 1, 1991 now abandoned.

FIELD OF THE INVENTION

The present invention concerns an improved means and method for aligning the phase of digital signals.

BACKGROUND OF THE INVENTION

High speed digital logic systems frequently run in a coherent manner, that is, a clock signal is distributed throughout the system to control the timing of system operation. When such systems run at high speeds, timing skew can occur between the data and clock. Timing skew is a misalignment of the clock and data phases from the desired alignment. For example, data transitions are usually set to occur during a portion of the clock cycle displaced from the clock transitions by a predetermined amount $\Delta\phi$. This is to allow data switching to complete before a clock transition occurs so that there is no ambiguity in detection of the data transition and so that undesired metastable logic states do not occur. Clock or timing skew results in $\Delta\phi$ being larger or smaller than desired. If left uncorrected, serious data transmission or data processing errors may occur.

Timing skew is particularly severe where data and clocks must be transmitted to different parts of the system over different distances and where the various parts of the system may be at different temperatures. Under these circumstances, the data and the local clock phases may be misaligned or vary with time or temperature in different ways in different parts of the system. The local clock is the clock signal present in the part of the system of interest and may be a distributed form of the system clock or a locally generated or regenerated clock or a clock produced in some other way that is coherent with the system clock.

Timing adjustments are used to compensate for skew. One way to correct for fixed skew is to measure the phase difference between the data and the local clock and then provide timing adjustments, for example, by means of different lengths of coaxial cable which equalize the propagation time. Such arrangements are costly and awkward. The cables are bulky and it is time consuming to test different portions of the system and trim the cables to the precise lengths that are needed. Also, such techniques are difficult to use over a broad range of frequencies and are unable to compensate for dynamic skew, that is, phase errors that change with time, temperature, etc. Dynamic phase skew is also referred to as "phase jitter".

In the past a variety of schemes have been developed to deal with dynamic skew. For example, Cordell describes a digital phase aligner in U.S. Pat. No. 4,756,011 and in a related article entitled, "A 45-M bit/s CMOS-VLSI digital phase aligner", *IEEE Journal of Solid State Circuits*, Vol. 23, No. 2, April 1988, pp.323-328. Cordell's arrangement is illustrated in FIG. 1.

Referring now to FIG. 1, prior art digital phase aligner (DPA) 10 comprises quartet sampler 12, increment-decrement controller 14 and bi-phase register and multiplexer 16. The detailed description and operation of Cordell's DPA 10 is described in detail in U.S. Pat. No. 4,756,011 which is incorporated herein by reference, and the related article cited above and will only be summarized here.

DPA 10 receives at input 18 to sampler 12, data D having variable phase alignment with respect to local reference clock $\phi(0)$ to which it is desired to be aligned. DPA 10 provides at data output 19 from register-multiplexer 16, aligned data $D_{out}$. Quartet sampler 12 receives multi-phase quadrature clock signals $\phi(0)$, $\phi(90)$, $\phi(180)$, $\phi(270)$ at inputs 20-23, where the numbers in parentheses indicate the relative phase of the clock signals supplied at inputs 20-23. Reference clock phase $\phi(0)$ is also supplied to controller 14 and register-multiplexer 16 at inputs 24, 26, respectively. Data D is propagated through sampler 12 and controller 14 to register-multiplexer 16. Data D is referred to as the "in-phase" data, that is, the data corresponding to clock phase $\phi(0)$. Data DA generated within sampler 12 is referred to as the "anti-phase" or "bi-phase" data, that is, the data corresponding to bi-phase or half-bit clock phase $\phi(180)$. DA is also propagated through controller 14 to register-multiplexer 16.

The operation of DPA 10 depends upon the fact that if a transition of data D is close to a clock transition and therefore not properly aligned, then the transition of DA will be far from a clock transition and will be aligned, and vice versa. DPA 10 automatically chooses between in-phase data D or anti-phase data DA so that the output data stream $D_{out}$ is aligned, i.e., the transitions of data stream $D_{out}$ are substantially stable with no bit errors due to misalignment.

Prior art DPA 10 uses a quadrature data sampling arrangement. Quartet sampler 12 detects whether a transition of data D occurs during quadrature phase intervals $\phi(0)$-$\phi(90)$, $\phi(90)$-$\phi(180)$, $\phi(180)$-$\phi(270)$, or $\phi(270)$-$\phi(0)$, and generates an "interference" output W, X, Y or Z identifying the respective quadrature phase interval during which the transition occurs. Sampler 12 provides interference signals W, X, Y, Z at outputs 30,31,32,33, in-phase data D at output 36 and anti-phase data DA at output 38.

Controller 14 propagates data D and DA to outputs 36',38' leading to register-multiplexer 16. Controller 14 decodes interference signals W,X,Y,Z to produce increment signal "UP" at output 40 or decrement signal "DN" at output 42 which, respectively, increment or decrement register-multiplexer 16 to transfer either data D or DA to aligned data output 19. Register-multiplexer 16 returns to controller 14, least-significant-bit signal LSB at output 46 so that controller 14 can know the current data state being transferred to aligned data output 19, i.e., either data D or DA.

DPA 10 operates according to the simplified truth-table shown in FIG. 2, where for different disagreement outputs W,X,Y,Z and different current data sample states (D or DA), the LSB state and multiplexer action are indicated. For example, if disagreement W from sampler 12 indicates that the current data transition occurs in first phase quadrant $\phi(0)$-$\phi(90)$, and if the previous data sample caused register-multiplexer 16 to have selected in-phase data D for delivery to aligned data output 19, then the LSB counter provides a "1" and register-multiplexer 16 changes aligned output 19 to anti-phase data DA. Conversely, if the previous data sample caused register-multiplexer 16 to have selected anti-phase data DA, then LSB is a "0" and register-multiplexer 16 remains unchanged so that data DA continues to be coupled to aligned data output 19. A similar analysis applies to the disagreements signals X,Y,Z.

A difficulty with prior art arrangement 10 is that it requires quadrature clocks which are difficult to generate, particularly as the operating frequency increases. Cordell has described an improved version in U.S. Pat. No. 4,821,296 which is also incorporated herein by reference. It replaces quartet sampler 12 with a sextet sampler in which two primary bi-phase samples (i.e., at $\phi(0)$ and $\phi(180)$) are used, each preceded and followed by two pairs of out-rigger samples for a total of six samples per clock period. The out-rigger samples are generated by a pair of two-stage delay circuits employing brief delays produced by inverters or other ordinary delay circuits which need not be precise phase increments, i.e., need not be ninety degree delays. With this arrangement, quadrature clocks are not needed.

However, Cordell's improved version still requires bi-phase ($\phi(0)$ and $\phi(180)$) clocks with their associated out-riggers. The bi-phase clocks sample the data stream twice each clock period to provide D and DA. Without this bi-phase sampling and its attendant out-riggers, Cordell's improved arrangement does not work. A difficulty is that, the requirement for the bi-phase clock limits the attainable system speed to substantially less than the inherent speed of the underlying IC technology. Cordell's data must be re-clocked using the zero-phase clock, and this results in a half-period clock cycle, thereby limiting the achievable clock rate to half that of the IC technology being employed. If the system speed is pushed closer to the inherent upper limit of the IC technology being used, it becomes impossible to reliably generate stable and reasonably accurate bi-phase clock timing that is immune to temperature and component variations. Hence, there is an ongoing need for DPA means and methods which avoid these and other limitations of the prior art.

SUMMARY OF THE INVENTION

The present invention provides a method and apparatus for aligning the phase of digital data with respect to the phase of a clock signal.

In a preferred embodiment, the apparatus of the present invention comprises generally, (i) an input means, (ii) M delay means, (iii) P registers where $P=M+1$, (iv) a comparator and (v) a decoder. The input means receives the input digital data desired to be aligned. The M delay means have incremental delays $D1 \ldots D_M$. The input data is serially coupled through the M delays and to the P registers.

The first of the P registers has its input coupled to an input of the first delay increment D1, the second register has its input coupled to an input of the second delay increment D2, and so forth until the $(P-1)$th register has its input coupled to an input of the $M^{th}$ delay increment and the $P^{th}$ register has its input coupled to an output of the $M^{th}$ delay increment.

The signals derived from the P registers are analyzed by the comparator in pairs (e.g., $P_2$ vs. $P_3$, $P_3$ vs. $P_4$, $P_{M+1}$ vs. $P_1$) which are separated at their inputs by one of the M delay increments. The signal from the last $(P_{M+1})$ register is compared with a signal from the first ($P_1$) register. These comparisons provide a disagreement signal. The disagreement signal identifies which of the $M+1$ timing increment (where M=the number of delays $D1 \ldots D_M$) during which the latest data transition occurred. The disagreement signal is sent to the decoder which selects one of two data outputs D or DD derived from outputs of two registers ($P_i$, $P_j$) as the aligned data output.

Having summarized the invention generally, in a preferred embodiment the two P registers ($P_i$, $P_j$) are separated at their inputs by at least one incremental delay ($D_k$), preferably at least two incremental delays ($D_k$, $D_{k\pm1}$). It is further desirable that the P registers each have N stages. It is desirable that $M \geq 2$ and $N \geq 1$, preferably with $M \geq 3$ and $N \geq 3$. The two registers ($P_i$, $P_j$) yielding the output data D, DD are preferably the first and third registers ($P_1$, $P_3$).

In a preferred embodiment wherein $M=3$, $P=4$ and there are four comparators producing outputs W, X, Y, Z respectively, the decoder desirably changes the selection of D or DD data streams from one to the other based on the state of the comparator inputs, as shown in Table I following.

TABLE I

| Comparator | Inputs Same? | Which Output D/DD Currently Selected? | Change Output D/DD yes/no? |
|---|---|---|---|
| first | yes (W=0) | doesn't matter | no |
| (W) | no (W=1) | D | yes;select later data |
|  | no (W=1) | DD | no |
| second | yes (X=0) | doesn't matter | no |
| (X) | no (X=1) | D | no |
|  | no (X=1) | DD | yes;select earlier data |
| third | yes (Y=0) | doesn't matter | no |
| (Y) | no (Y=1) | D | no |
|  | no (Y=1) | DD | yes;select later data |
| fourth | yes (Z=0) | doesn't matter | no |
| (Z) | no (Z=1) | D | yes;select earlier data |
|  | no (Z=1) | DD | no |

The decoder selects as output whichever data stream (D/DD) has its transition furthest in time from the clock transition of interest. Also, a bi-phase register is desirably provided with inputs coupled to the two registers ($P_i$, $P_j$) and the decoder whereby the decoder selects data D, DD from an earlier or later stage of the bi-phase register, as indicated in the Table I, to insure that no bits are lost or repeated. It will be noted that the "Change D/DD Output" column of Table I is opposite to the "Actions Needed" column of Prior Art FIG. 2. This is because the DD data stream of the present invention is an earlier sample of the input data while the DA data stream of FIGS. 1–2 is a later sample of the input data.

The present invention further provides, generally, a method for aligning the phase of digital data with respect to the phase of a clock signal, comprising: providing input means for receiving the digital data desired to be aligned, passing the data sequentially through M incremental delays $D_M$, and to P registers of N stages each where $P=M+1$ arranged so that the first of the P registers receives the data without any of the M delays, the second register receives the data after delay increment D1, and continuing until the $(P-1)^{th}$ register receives the data after delay increment $D_{M-1}$ and the $P^{th}$ register receives the data after delay increment $D_M$, and further comprising comparing signals derived from the P registers in adjacent pairs which are separated at their inputs by successive delay increments $D1, D2 \ldots D_M$ and with the last register being compared with a signal from the first register, to provide a disagreement signal indicating during which of the $M+1$ timing increments a data transition has occurred, and selecting one of two data outputs derived from outputs of two of the P registers as the aligned data output.

Having described the method of the invention generally, in a preferred embodiment it is a desirable that the step of selecting one of two of the P registers comprises selecting from registers separated at their inputs by at least one incremental delay means, preferably at least two incremental delay means.

It is further desirable that the passing steps comprise passing the data through M delay increments where $M \geq 2$ and N stage registers where $N \geq 1$, preferably where $M \geq 3$ and $N \geq 3$. It is still further desirable that the step of selecting one of two of the P registers comprises selecting from the first and third registers. Also, the data is desirably chosen from an earlier or later stage of a bi-phase register coupled to the two registers, to ensure that no bits are lost or repeated.

The present invention will be more fully understood by considering the below-listed drawings and the explanation thereof that follows.

BRIEF DESCRIPTION OF THE DRAWINGS

FIG. 1 is a simplified block diagram of a digital data phase aligner according to the prior art;

FIG. 2 is a simplified truth table for the operation of the digital data aligner of FIG. 1;

Like reference numerals are used to refer to like or similar elements in the various figures.

DETAILED DESCRIPTION OF THE DRAWINGS

Figure 3:
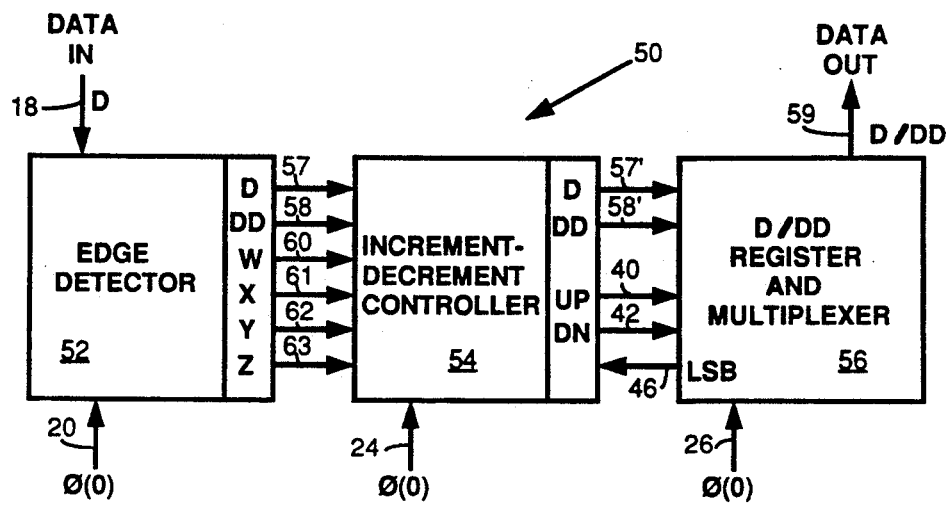
FIG. 3 is a simplified block diagram of a digital data phase aligner according to the present invention.

A broadband digital phase aligner (DPA) according to a preferred embodiment of the present invention is illustrated in block diagram form in FIG. 3.

Referring now to FIG. 3, digital phase aligner (DPA) 50 comprises data transition (edge) detector 52, increment-decrement controller 54 and two-stream, parallel, data+delayed data register-multiplexer 56. The construction and operation of increment-decrement controller 54 and register-multiplexer 56 is substantially the same as discussed in connection with controller 14 and register 16 of FIGS. 1–2 and reference may be had to Cordell's U.S. Pat. Nos. 4,756,011 and 4,821,296 for further details. This arrangement is preferred, but other implementations having the functions described herein may also be used.

DPA 50 receives at input 18 to edge detector 52, data D having variable phase alignment with respect to local reference clock $\phi(0)$ to which it is desired to be aligned, and provides at data output 19 from register-multiplexer 56, aligned data D'. Output 59 is analogous to output 19 of FIG. 1.

Edge detector 52 receives single phase local clock signal $\phi(0)$ at input 20. Local clock phase $\phi(0)$ is also supplied to controller 54 and register-multiplexer 56 at inputs 24, 26, respectively. Single phase local clock signal $\phi(0)$ can be single-ended, differential or non-overlapping. As used herein, the terms "single phase clock" and "single clock phase" are intended to refer to an arrangement wherein all registers or/and flip-flops transition on the same clock edge. This is in contrast from bi-phase clocking where both rising and falling clock edges are used to initiate gate or register transitions.

Data D is propagated through edge detector 52 and controller 54 to register-multiplexer 56 and is referred to as the "in-phase" data, that is, the data corresponding to clock phase $\phi(0)$. Delayed data DD is generated within edge detector 52. Delayed data DD is also conveniently propagated through controller 54 to register-multiplexer 56 via outputs 57, 58 and 57', 58'. While it is convenient to propagate in-phase data D and delayed data DD through controller 54 to register-multiplexer 56, this is not essential and they may pass directly from detector 52 to register-multiplexer 56.

The operation of DPA 50 depends upon the fact that if a transition of data D is close to a clock transition and therefore not properly aligned, then the transition of delayed data DD will be far from a clock transition and will be aligned, and vice versa. DPA 50 automatically chooses between in-phase data D or delayed data DD so that the output data stream D is aligned, i.e., the transitions of data stream D are spaced away from the transitions of local clock $\phi(0)$. Furthermore, the data D or the delayed data DD is chosen from an earlier or later stage of the bi-phase shift register so that no bits are lost or repeated in the transition. The selected data can be skewed by several bit periods without loss of data.

Selection of which of in-phase data D or delayed data DD is coupled to aligned data output 59 of DPA 50 is accomplished in much the same way as for the prior art arrangement of FIG. 1. In a preferred embodiment, edge detector 52 generates disagreement signals W, X, Y, Z at outputs 60, 61, 62, 63 analogous to disagreement signals of the same name produced by quartet sampler 12 at outputs 30, 31, 32, 33. These disagreement signals are used in substantially the same way by controller 54 to produce increment "UP" signal output 40 and decrement "DN" signal output 42, which are coupled to register-multiplexer 56 to select between in-phase data stream D and delayed data stream DD being propagated from edge detector 52 through outputs 57, 58 and 57', 58' to register-multiplexer 56 to select the correct data output stream, and with LSB signal 46 fed back to controller 54 for the same purpose as before. DPA 50 operates according to the same truth table as shown in FIG. 2 for prior art system 10 but with delayed data DD substituted for anti-phase data DA.

Edge detector 52 has a different construction and operation than prior art quartet sampler 12 described in U.S. Pat. No. 4,756,011 and the related article cited above, or than improved prior art sextet sampler described in U.S. Pat. No. 4,821,296. These differences overcome numerous deficiencies of the prior art. These differences and the benefits thereof will be understood more clearly by reference to FIGS. 4–6.

Edge detector 52 differs from the prior art arrangements in that, among other things, it requires only the input data D and the local reference clock $\phi(0)$ to which the data is being aligned. It does not need to receive either quadrature or bi-phase clock signals, nor does it generate such additional clock signals internally.

Figure 4:
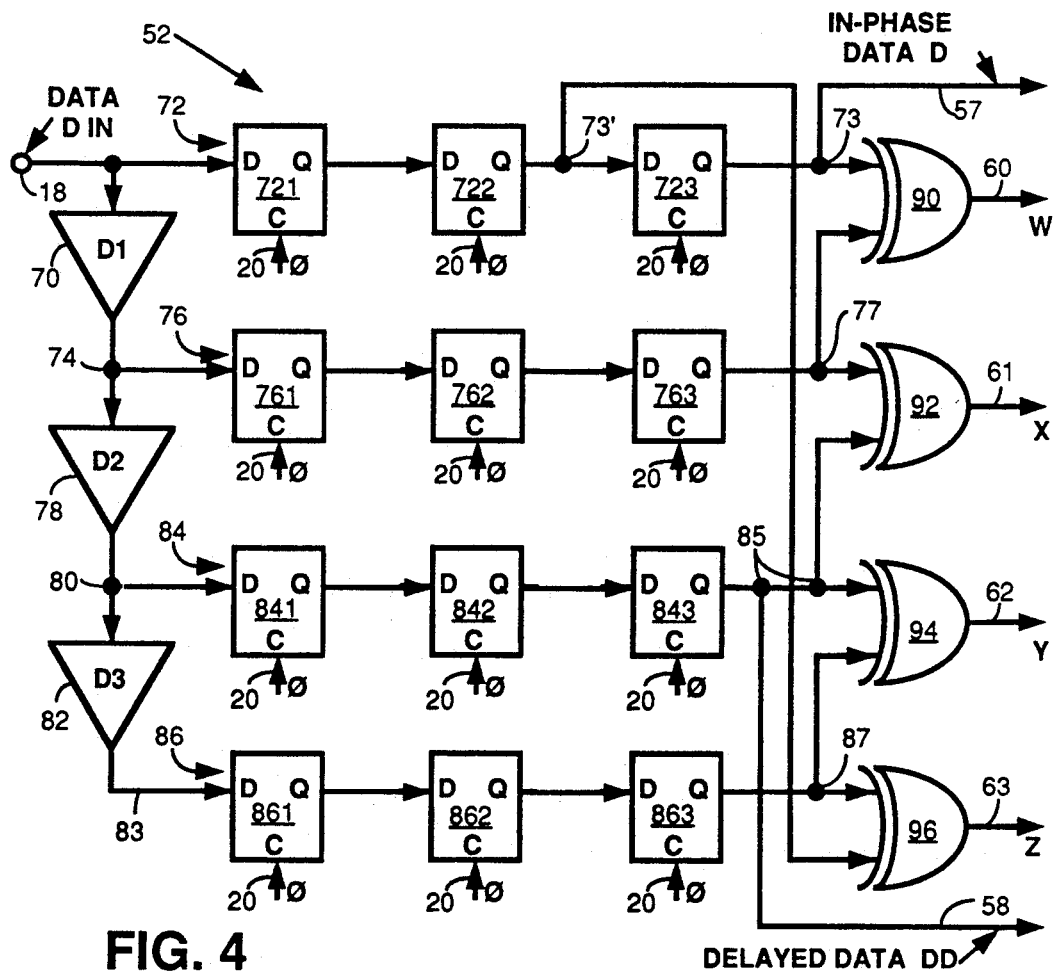
FIG. 4 is a block diagram of a portion of the phase aligner of FIG. 1 showing additional detail.

FIG. 4 shows improved edge detector 52 according to a preferred embodiment of the present invention and in greater detail. Edge detector 52 receives input data D at input 18 which it directs to first delay means 70 having delay D1 and to N-stage register 72. In this example, N-stage register 72 has three stages, 721, 722, 723. N-stage register 72 has output 73 after stage N and output 73' after stage N−1. All stages of register 72 are driven by local reference clock $\phi(0)$ received through input 20, as are registers 76, 84 and 86.

Input data D passes through first delay means 70 to node 74 where it is coupled to second N-stage register 76 and second delay means 78 having delay D2. In this example, N-stage register 76 has three stages, 761, 762, 763. N-stage register 76 has output 77 after stage N. Register 76 is driven by clock $\phi(0)$ in the same manner as for register 72.

After passing through first delay means 70 having delay D1 and second delay means 78 having delay D2, input digital data D arrives at node 80 with delay D1+D2 where it is presented to third delay means 82 having delay D3 and to third N-stage register 84. In this example, N-stage register 84 has three stages, 841, 842, 843. N-stage register 84 has output 85 after stage N. After passing through third digital delay means 82, the data stream is presented to N-stage register 86 having, in this example, three stages, 861, 862, 863, and output 87 after stage N.

Outputs 73, 77 of registers 72, 76 are presented to inputs of exclusive OR circuit 90 whose output provides disagreement signal W at output 60 when outputs 73, 77 differ. Outputs 77, 85 of registers 76, 84 are presented to the inputs of exclusive OR circuit 92 whose output provides disagreement signal X at output 61. Outputs 85, 87 of registers 84, 86 are presented to the inputs of exclusive OR circuit 94 whose output provides disagreement signal Y at output 62. Output 87 of register 86 and output 73' of stage N−1 of register 72 are presented to the input of exclusive OR circuit 96 whose output provides disagreement signal Z at output 63.

While circuits 90, 92, 94, 96 are described as being exclusive OR circuits, they may take any form so long as disagreement signal W, X, Y or Z is provided when the respective register outputs feeding the inputs of circuits 90, 92, 94, 96 are different and no signals when the respective outputs of the registers feeding respective circuits are the same, or the inverse thereof. One of disagreements W, X, Y, Z will be different than the others when a data transition occurs, e.g., either high or low depending upon the type of decode logic being used.

In-phase data D appearing at output 57 is conveniently taken from output 73 of first register 72. Delayed data DD appearing at output 58 is conveniently taken from output 85 of register 84. Delayed data DD is conveniently separated from input data D by delay DD=D1+D2. It is desirable that DD equal about ninety degrees, and preferably about one hundred and eighty degrees, but this is not essential. Any amount which is large enough to provide for adequate separation of the clock and data transitions is sufficient.

Delay means 70, 78, 82 may be a simple active or passive buffers or delay lines, as for example, monolithic delay lines formed on the associated integrated circuit on which edge detector 52 is fabricated. Other delay means may also be used. The incremental delay (i.e., D1, D2, D3) provided by each of delay means 70, 78, 82 should be greater than the sampling aperture of the flip-flops 721, 761, 841, 861. Considerable variation can be tolerated in delay amounts D1, D2, D3 and great precision is not required. While it is desirable that delay amounts D1, D2, D3 be substantially equal, this is not essential.

N-stage registers 72, 76, 84, and 86 are shown as having N=3, but larger or smaller values of N can also be used. A minimum of N=1 is required to provide a clock delay between the first sample at 73 and the last sample at 73'. Additional states are desirable to minimize the probability of metastable states at the register outputs, i.e., ambiguities caused by misalignment of clock and data at the flip-flop input. As N increases, the probability of a metastable state is reduced, at the cost of increased complexity and power consumption.

Three delay increments D1, D2, D3 are illustrated in FIG. 4, but any number of delays $D_M$ ($M \geq 2$) can be used. The choice of M affects the number of data registers that must be used to hold the output data streams. For example, with M=3, bi-phase registers are used (i.e., two parallel data streams for D and DD data). For M=2, tri-phase registers are used (i.e., three parallel data streams for D', DD' and DDD' data). This is explained more fully in connection with FIGS. 6A–C.

The clock period is divided into M+1 time increments or segments by the M delay buffers. Assuming bi-phase output registers holding the direct and delayed data streams, as for example similar to those used in the U.S. Pat. Nos. 4,756,011 or 4,821,296, then if M<3, the circuit cannot guaranty at least one buffer delay between the clock and the data transitions, and clock and data transitions can occur in adjacent time segments. M=3 produces four time segments so that data and clock transitions can be separated by one time segment. For M>3, the clock and data signals are separated by more than one time segment. M>3 is permissible but not desirable because it merely increases the number of register flip-flops with no corresponding improvement in performance. Thus, M=3 is preferred.

Four N-stage registers 72, 76, 84, 86 are shown as being used in preferred edge detector 52, but a larger number P of registers can be used, provided that P=M+1, where M is the number of delay increments D1, D2, ... $D_M$. Stated more generally, edge detector 52 comprises P registers of N stages each, each register being separated by one of M=P−1 delay increments, with M≥2 and N≥1, with the preferred arrangement being M≥3, N≥3 and P≥4, and with M=3, N=3, P=4 being typical. However, other values of M, N and P (consistent with the interrelations explained above) being may also be used.

Outputs of the P registers are compared in pairs to generate one of P possible interference signals corresponding to which of the M delay increments during which the current data transition occurred. The aligned data is selected from either in-phase data D or delayed data DD where in-phase data D and delayed data DD are separated by at least two of delay increments D1, D2 ... $D_M$, and the one of in-phase data D or delayed data DD selected as the aligned data is separated from the relevant clock transition by at least one of delay increments D1, D2 ... $D_M$.

While the delay and logic elements of FIG. 4 are shown as being non-inverting, those of skill in the art will understand that the same result can be accomplished with inverting logic or a combination of inverting and non-inverting logic. Those of skill in the art will understand how to modify the arrangement of FIGS. 3–4 depending upon the type of logic desired to be used. What is important is that aligned data output 59 be switched between incoming data stream D or delayed data stream DD depending upon where the data transition edges are detected with respect to delays $D_1$-$D_M$, where M=2, 3, 4, . . . etc., typically M=3, 4, . . . etc..

Figure 5:
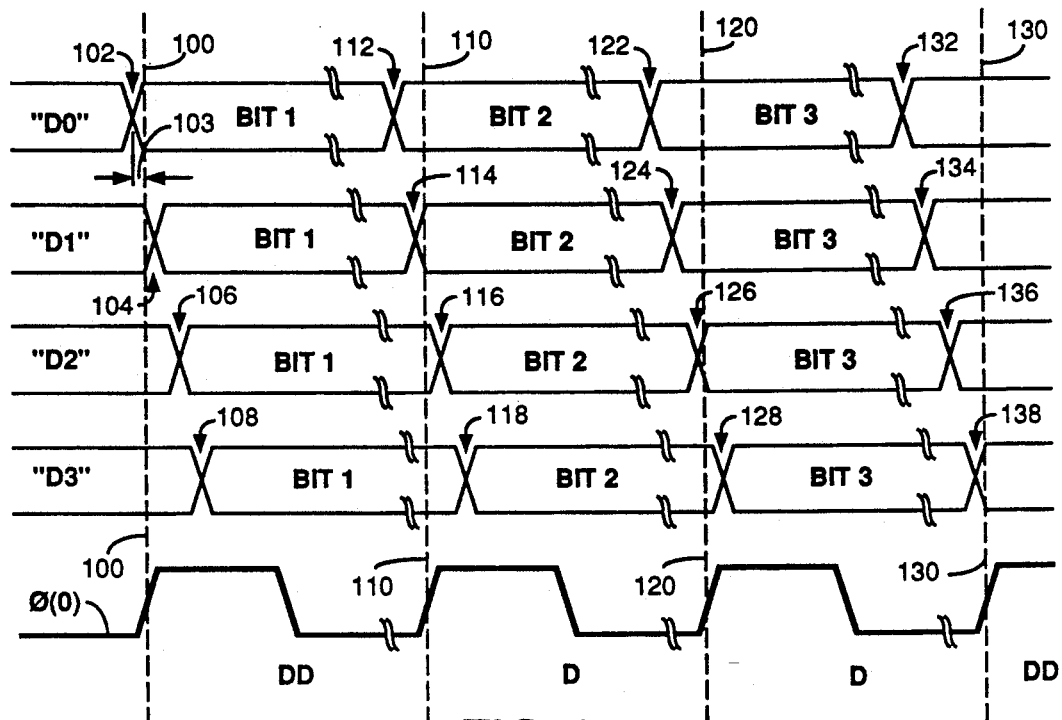
FIG. 5 is a timing diagram illustrating the operation of the digital phase aligner of the present invention.

FIG. 5 provides a timing diagram illustrating how edge detector 52 functions. Shown in FIG. 5 are incoming data stream D (identified as "D0"), delayed data stream "D1" after passing through delay D1, delayed data stream "D2" after passing through delay D2, and data stream "D3" after passing through delay D3. FIG. 5 also shows clock signal $\phi(0)$ received at input 20. Dashed lines 100, 110, 120, 130 indicate various clock transition times of interest. Data stream "D0" has transitions 102, 112, 122, 132 which are skewed with respect to clock transitions 100, 110, 120, 130, in this example, occurring earlier in time. For example, phase delay 103 between data transition 102 and clock transition 100 may be large or small and may be time varying. If transition 102 occurs too close to transition 100 (or data transitions 112, 122, 132 occur too close to clock transitions 110, 120, 130) so that phase or time difference 103 is small, then phase uncertainty will occur and various data bits may be lost in the system. FIG. 5 shows that, as a result of passing through delay means 70, 78, 82, delayed data streams "D1", "D2", "D3" are shifted in phase by delay amounts D1, D2, D3 so that data transitions 104, 106, 108, for example, fall on one side or the other of clock transition 100.

Considering the situation shown in FIG. 5 with respect to clock transition 100, when the outputs of data registers 72, 76 are compared in exclusive OR circuit 90, transitions 102, 104 of data streams "D0", "D1" straddle clock transition 100 and outputs 73, 77 of registers 72, 76 are in different states if successive bits are different. Therefore, when a data transition occurs, output W of comparator 90 will indicate that there is disagreement between data streams "D0", "D1" flowing through registers 72, 76 which bracket clock edge 100. However, when the outputs of registers 76, 84 and 84, 86 and 86, 72(N−1) are compared in exclusive OR circuits 92, 94, 96, there is no disagreement between the signals passing through these registers because the transitions are all on the same side of clock transition 100, i.e., they do not bracket transition 100. Therefore the inputs to exclusive OR circuits 92, 94, 96 are the same and there are no X,Y,Z disagreement outputs. Thus, according to the control logic truth table in FIG. 2 (substituting DD for DA), the W disagreement signal causes control logic 54 to maintain or transfer delayed data DD to output 59 of register-multiplexer 56. It can be seen by inspection of FIG. 5, that under the circumstances illustrated with respect to data transition 102 and clock transition 100, delayed data DD derived from data stream "D2" are a suitable output while input data D corresponding to data stream "D0" are becoming too close to transition 100 to be reliable. Thus, DD is selected and the objective of providing alignment of the data transitions with the local clock $\phi(0)$ is accomplished.

FIG. 5 illustrates at clock transitions 110, 120, and 130 a situation where, for whatever reason, the skew has changed, e.g., because the clock has suffered phase drift relative to the data. At clock transition 110, data transitions 112, 114 occur before clock transition 110 and data transitions 116 and 118 occur after. Under these circumstances, an X disagreement is obtained when a data transition occurs. At clock transition 120, data transitions 122, 124 and 126 occur before clock transition 120 and data transition 128 after. Under these circumstances a Y disagreement is generated when a data transition occurs. Finally at clock transition 130, data transitions 132, 134, 136 and 138 occur before clock transition 130 and a Z disagreement is generated when a data transition occurs. The appropriate choice of D or DD for the aligned output to be sent to output 59 can be determined from inspection of FIGS. 2 or 5. In each case it is the data stream (D or DD) which is removed more than one full delay (D1, D2, or D3) from the relevant clock transition (100, 110, 120, 130). D or DD is chosen from an earlier or later stage in the bi-phase register to ensure that no bits are lost or repeated. This is shown at the bottom of FIG. 5, as follows: DD is the correct choice for transition 100, D for transitions 110, 120 and DD again for transition 130. The aligned output choice is shown in Table 1 above.

While FIG. 5 shows the skew changing with successive clock cycles, those of skill in the art will understand that this is merely for convenience of explanation and that the skew may be stable for many clock cycles or change more rapidly or may change more slowly, and that the amount of skew may be larger or smaller than that indicated in FIG. 5. In each case, the control logic chooses whichever of D or DD has its data transitions at least one full delay from the clock transition.

Aligning the phase of digital data with respect to the phase of a clock signal is accomplished by providing input means for receiving the digital data desired to be aligned, passing the data sequentially through M incremental delays $D_M$, and to P registers (preferably of N stages) each where P=M+1 arranged so that the first of the P registers receives the data without any of the M delays, the second register receives the data after delay increment D1, and continuing until the $(P-1)^{th}$ register receives the data after delay increment $D_{M-1}$ and the $P^{th}$ register receives the data after delay increment $D_M$, and further comprising comparing signals derived from the P registers in adjacent pairs which are separated at their inputs by successive delay increments D1, D2 . . . $D_M$ and with the last register being compared with a signal from the first register, to provide a disagreement signal indicating during which of the M+1 timing increments a data transition has occurred, and selecting one of two data outputs derived from outputs of two of the P registers as the aligned data output.

It is desirable that the step of selecting one of two of the P registers comprises selecting from registers separated at their inputs by at least one incremental delay means, preferably at least two incremental delay means.

The passing steps desirably comprise passing the data through M delay increments where $M \geq 2$ and N stage registers where $N \geq 1$, preferably where $M \geq 3$ and $N \geq 3$. For M=3, the step of selecting one of two of the P registers desirably comprises selecting from the first and third registers.

In a preferred implementation, the method comprises, receiving the input digital data, passing the data to an N-stage first shift register and to a first delay means having a predetermined first delay and an output, passing the data delayed by the first delay to a second shift register and to a second delay means having a predetermined second delay and an output, passing the data delayed by the second delay to a third shift register and to a third delay means having a predetermined third delay and an output, passing the data delayed by the third delay to a fourth shift register, identifying which of paired outputs of (i) the first and second registers, (ii)

the second and third registers, (iii) the third and fourth registers and (iv) the fourth register and an output of the N−1 stage of the first register, is different, and then selecting as the aligned digital data bit, a data bit from a register whose output is the same as data bits from adjacent registers during the clock cycle of interest. This is especially suitable where N≧3.

For a simple flip-flop, the amount of phase skew attenuation is constant regardless of the skew frequency. The digital phase aligner, on the other hand, can attenuate skew amplitudes as large as several times the clock period at low frequencies. Low frequency skew appears as phase drift. If the phase skew frequency is comparable to the clock frequency, the control logic may be fooled by multiple data edges moving in the same direction.

The digital phase aligner of the present invention can completely absorb dynamic phase skew out to about 720 degrees phase shift at low jitter frequencies, thereafter declining to about 60 degrees as the jitter frequency approaches the clock frequency or higher. Additional phase skew may be absorbed by modifying DPA 50 so that the length of the bi-phase register is increased. The DPA can absorb phase shifts of $\pm(360)(Q)$, where $Q = \text{Int}[(R-1)/2]$ and R is the number of flip-flops in either leg of the bi-phase register.

It is desirable that the control logic of the present invention require multiple non-contradictory disagreement signals before changing the output of register-multiplexer 56. This is accomplished by decoding logic which stores the present and previous states of W, X, Y, Z. The decoding logic takes action only in the case of S successive occurrences of the same error signal. It is necessary that S≧1, and desirable that S≧2. As S increases, the probability of an erroneous multiplexer change is reduced, but the frequency of the phase jitter that can be accommodated is reduced.

By employing the DPA of the present invention, bit error rates can be substantially reduced. For example, with Phase jitter comparable to that observed on long-haul telephone lines, the calculated bit error rate is less than $10^{-15}$.

Figure 6A:
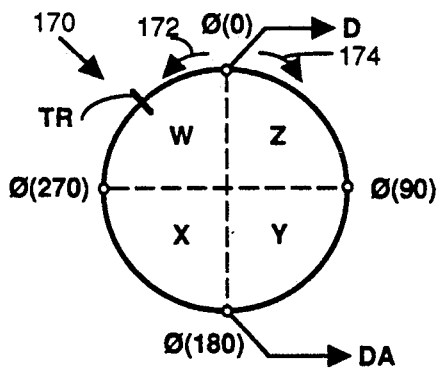
FIGS. 6A–C are phase-plane representations of methods for removing skew and choosing the desired data phase, comparing a prior art implementation (FIG. 6A) with implementations according to the present invention (FIGS. 6B–C).
Figure 6B:
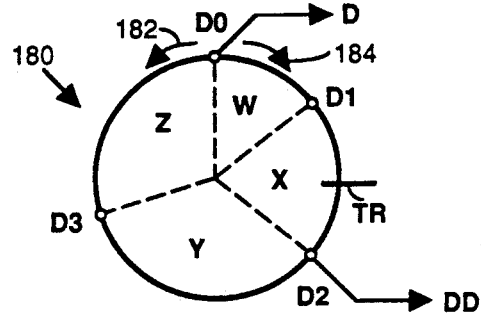
Figure 6C:
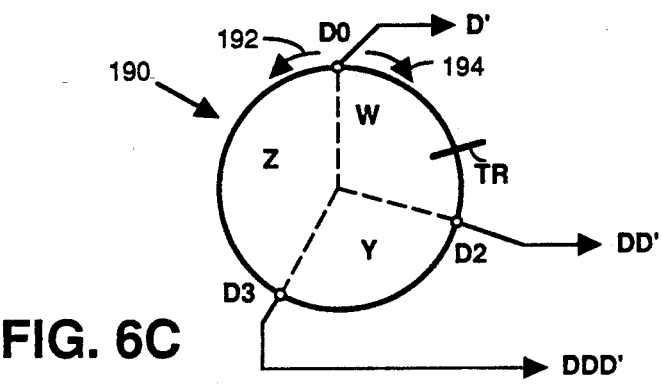

FIGS. 6A-C are phase plane representations of data skew in relation to the clock phase or phases, and provide a particularly simple means of understanding the operation of automatic phase alignment systems. FIG. 6A corresponds to a prior art arrangement using quartet sampling, and FIGS. 6B-C correspond to embodiments of the present invention, where M=3 (FIG. 6B) and where M=2 (FIG. 6C). Circles 170, 180, 190 in FIGS. 6A-C represent the loci of phase displacement of a data transition relative to the local clock(s). The top of each circle 170, 180, 190 is the reference phase. A representative data transition TR is shown in each of FIGS. 6A-C. The M delays divide the phase circle into M+1 time increments, i.e., there are M+1 sectors in the circle..

FIG. 6A corresponds to the quartet sampler of the prior art shown in FIGS. 1-2 and has clock transitions represented by the small circles located at 0°, 90°, 180°, and 270°. By way of example, data transition TR is located in the "W" quadrant and disagreement signal W is therefore present, as has been previously explained. The output data streams D, DA are derived from data sampled by the 0° and 180° clock phases. If transition TR occurs in the W quadrant, as shown in FIG. 6A, and the previously chosen output data stream corresponded to "D", then, according to FIG. 2, the control logic causes a change in the output data stream to output "DA" selecting earlier data in the bi-phase register. In the context of FIG. 6A, this corresponds to moving around circle 170 to output DA.

FIG. 6B corresponds to the arrangement of the present invention illustrated in FIGS. 3-5 having a single phase clock and three delays D1, D2, D3. The reference phase corresponding to undelayed data D0 is located at the top of phase circle 180. Output data streams D and DD propagated to bi-phase register 56 (see FIG. 3) correspond to D0 and D2 (see FIGS. 4-5). By way of example, FIG. 6B shows data transition TR located in the X sector so that an X disagreement signal is present. According to Table I, if the previously chosen data stream was D, then no change is the output data stream is needed. Conversely, if the previously chosen data steam is DD, then the control logic causes a change in the output data stream to output D selecting earlier data in the bi-phase register. In the context of FIG. 6B, this corresponds to moving around circle 180 from output DD to output D.

An advantage of the phase plane representation of FIGS. 6A-C is that a general rule can be formulated based on the use of the phase-plane diagrams which tells what output data stream to select and whether to select earlier data or later data so as to avoid loss or repetition of data bits. The rule is illustrated in terms of FIG. 6B but applies as well to FIGS. 6A and 6C with appropriate substitution of data stream identification and reference numerals for corresponding arrows, i.e., 172 or 192 for 182 and 174 or 194 for 184. The rule is stated as follows:

(i) Determine which output data stream (e.g., D, DD) is current;
(ii) If the current data stream (D,DD) does not form a boundary of the sector (W, X, Y, Z) containing data transition TR, do nothing; or
(iii) If the current data stream (D,DD) forms a boundary of the sector (W, X, Y, Z) containing data transition TR, then determine which direction (clockwise or counter-clockwise) around the phase circle one must move in order to go from the current output data stream location to the other output data stream (DD, D) location without crossing data transition TR; and
(iv) If rotation is clockwise (e.g., in the direction of arrows 184) select earlier data from the other output data stream (DD, D) in the bi-phase register, or
(v) If the rotation is counter-clockwise (e.g., in the direction of arrows 182) select later data from the other output data stream (DD, D) in the bi-phase register.

Application of the foregoing rule to FIG. 6C is explained below.

FIG. 6C illustrates a further embodiment of the present invention wherein M=2 so that there are three time sectors produced by two delays D2, D3 (D1 is omitted). With this arrangement, register-multiplexer 56 must be a tri-phase register, that is, three parallel registers propagating three alternative output data streams D', DD' and DDD' corresponding to data streams D0, D2 and D3. Means and methods for constructing tri-phase registers and selecting any of the three data streams therein are well known in the art, and may be understood by analogy to bi-phase registers.

In FIG. 4, delay D1 and associated registers 76 and gate 92 are omitted and the input of delay stage 78 (delay D2) is connected directly to input data input 18.

Output data stream D' is derived from output 73, output data stream DD' is derived from output 85 and output data stream DDD' is derived from output 87. Gates 90, 94 generate disagreement signals W, Y, Z in the same manner as previously described but with delay D1, register 76 and gate 92 omitted. The operation of this arrangement is easily understood by reference to the phase diagram of FIG. 6C and the above-stated rule.

In FIG. 6C phase circle 190 has sectors W, Y, Z corresponding to disagreement signals W, Y, Z generated depending upon the phase skew of data transition TR. In the example of FIG. 6C, data transition TR occurs in the W sector. The rule set forth above (i.e., steps (i)-(v)) applies to FIG. 6C taking into account that there are now three possible output data streams D', DD', DDD'.

If the current data stream (D', DD', DDD") does not bound the sector containing transition TR, then there is no change. If the current output data stream bounds the sector containing data transition TR, then one changes the output to the data stream that does not bound the transition sector moving clockwise or counter-clockwise according to the rule of not crossing over TR.

For example, with data transition TR located in the W sector, if the current output is D', move counter-clockwise (arrow 192) to DDD' and select later data from the tri-phase register. If the current output is DD', move clockwise (arrow 194) to DDD', and select earlier data from the tri-phase register. It will be apparent from the foregoing that rules (i)-(v) above apply for any number of delays (M≧2) and correctly select earlier or later data so that no data bits are omitted or repeated.

The arrangement of FIG. 6C has the disadvantage of requiring a tri-phase register but the advantage of allowing faster operation than arrangements using bi-phase registers. This is because the sum of the delays $SD = D1 \ldots D_M$ must be less than the clock period CP by some amount $\Delta$ which is at least equal the smallest physically realizable sampling aperture (e.g., for a flip-flop) for whatever technology is being used, i.e., $(SD + \Delta) \leq CP$. The fastest operation occurs when the incremental delay, $D_i = \Delta$, and $SD = (M+1) \cdot D_i$. The smaller the value of M, the smaller SD, the smaller CP and the greater the clock frequency $f_\phi = 1/CP$. Thus, $M = 2$ permits faster operation than $M \geq 3$.

Based on the foregoing description, it will be apparent to those of skill in the art that the present invention has substantial advantages as pointed out herein, namely: it accommodates both large and small clock/data skew over a broad band of skew frequencies, it does not require the use of quadrature clocks, it does not require the use of half-bit (bi-phase) clocking in the sampler, it eliminates the use of measured lengths of coaxial cables, it is completely automatic and it permits higher clock frequencies.

By eliminating the inevitable frequency compromises associated with quadrature and/or half-bit clocking, the present invention takes full advantage of the inherent speed of the IC technology used to implement the system. Unlike the prior art, the phase aligner of the present invention does not prevent operation at the maximum available frequency dictated by the performance of the semiconductor technology. These are substantial advantages of great practical utility.

While the present invention has been described in terms of particular structures and steps, these choices are for convenience of explanation and not intended to be limiting. For example, those of skill in the art will understand that the designations of earlier or later data in the register-multiplexer depends upon how the data streams have been defined. Those of skill in the art will understand based on the description herein, that the present invention applies to other arrangements, steps and manners of defining the data streams, and it is intended to include in the claims that follow, these and other variations as will occur to those of skill in the art based on the present disclosure.

We claim:

1. An apparatus for aligning the phase of digital data with respect to a single phase clock signal, comprising:
   input means for receiving the digital data desired to be aligned;
   M delay means coupled to the input means for providing incremental M delays to the received digital data;
   P registers of N stages each where $P = M + 1$, wherein the P registers are coupled to the M delay means, and wherein at least first stages of each of the P registers are responsive to the signal phase clock signal, and wherein the data are serially coupled through the M delay means and to the P registers arranged so that a first of the P registers has its input coupled to an input of a first of the M delay means, a second register has its input coupled to an input of a second of the M delay means, continuing until a $(P-1)^{th}$ register has its input coupled to an input of an $M^{th}$ delay means and a $P^{th}$ register has its input coupled to an output of the $M^{th}$ delay means;
   means for comprising signals derived from the P registers in adjacent pairs separated at their inputs by one of the M delay means and the $P^{th}$ register being compared with a signal from the first register, to provide a disagreement signal indicating during which of the delays provided by the M delay means a data transition has occurred; and
   logic means for receiving the disagreement signal and selecting one of at least two data outputs derived from outputs of at least two of the P registers as the aligned data output.

2. An apparatus as claimed in claim 1, wherein the at least two of the P registers are separated at their inputs by at least one incremental delay.

3. An apparatus as claimed in claim 1, wherein the at least two of the P registers are separated at their inputs by at least two incremental delays.

4. An apparatus as claimed in claim 1, wherein $M \geq 2$ and $N \geq 1$.

5. An apparatus as claimed in claim 4, wherein $M \geq 3$ and $N \geq 3$.

6. An apparatus as claimed in claim 5, wherein the at least two of the P registers are the first and the third register.

7. An apparatus for aligning the phase of digital data with respect to the phase of a clock signal, comprising:
   input means for receiving the digital data desired to be aligned;
   M delay means providing incremental M delays to the received digital data, P registers of N stages each wherein $P = M + 1$, wherein the data are serially coupled through the M delay means and to the P registers arranged so that a first of the P registers has its input coupled to an input of a first of the M delay means, a second register has its input coupled to an input of a second of the M delay means, continuing until a $(P-1)^{th}$ register has its input coupled to an input of an $M^{th}$ delay means and a $P^{th}$ register has its input coupled to an output of the $M^{th}$ delay means;

means for comparing signals derived from the P registers in adjacent pairs separated at their inputs by one of the M delay means and the $P^{th}$ register being compared with a signal from the first register, to provide a disagreement signal indicating during which of the delays provided by the M delay means a data transition has occurred;

logic means for receiving the disagreement signal and selecting one of at least two data outputs derived from outputs of at least two of the P registers as the aligned data output; and wherein M=3, and P=4 and there are P means for comparing the signals derived from the registers in adjacent pairs, and wherein the logic means changes the selecting of one of two data outputs (D or DD) from one to the other based on whether inputs of the first through fourth means for comparing the signals are the same (yes) or not (no), where W, X, Y, Z represent binary outputs, respectively, of the first through fourth means for comparing, as follows:

| Comparing means | Inputs Same? | Which Output D/DD Currently Selected? | Change Output D/DD yes/no? |
| --- | --- | --- | --- |
| first | yes (W=0) | doesn't matter | no |
| (W) | no (W=1) | D | yes; select later data |
|  | no (W=1) | DD | no |
| second | yes (X=0) | doesn't matter | no |
| (X) | no (X=1) | D | no |
|  | no (X=1) | DD | yes; select earlier data |
| third | yes (Y=0) | doesn't matter | no |
| (Y) | no (Y=1) | D | no |
|  | no (Y=1) | DD | yes; select later data |
| fourth | yes (Z=0) | doesn't matter | no |
| (Z) | no (Z=1) | D | yes; select earlier data |
|  | no (Z=1) | DD | no |

8. An apparatus as claimed in claim 1, wherein M=2 and P=3 and data outputs are derived from the P registers, and further comprising P means for temporarily storing the data outputs from the P registers, and wherein the logic means selects as the aligned data output, data from a $P_i$ means for temporarily storing the data outputs corresponding to a $P_i$ register.

9. An apparatus for aligning the phase of a digital signal with respect to the phase of a signal phase clock signal, comprising:

edge detector means for receiving an input digital signal and the single phase clock signal and providing first and second output digital signals related to the input digital signal at times determined by the signal phase clock signal, and for further providing one or more output disagreement signals indicating whether a transition of the input digital signal and a corresponding transition of a replica of the input digital signal delayed by a second predetermined amount occur in time so as to bracket a transition of the single phase clock signal;

control logic means for receiving the disagreement signals and providing an output selection signal based thereon; and means driven by the single phase clock signal for temporarily storing the first and second output digital signals received from the edge detector means and, under control of the selection signal from the control logic means, providing delayed versions of either the first or second output digital signals as the phase aligned output digital signal.

10. An apparatus as claimed in claim 9, wherein the selection signal selects as the phase aligned output digital signal, the one of the first or second output digital signals whose transition occurs furthest in time from a corresponding transition of the single phase clock signal.

11. A method for aligning the phase of digital data with respect to the phase of a clock signal, comprising steps of:

providing input means for receiving the digital data desired to be aligned;

passing the received digital data sequentially through M incremental delays $D_1, D_2 \ldots D_{M-1}, D_M$, and to P registers of N stages each where P=M+1 arranged so that a first of the P registers receives the data without any of the M incremental delays, a second register receives the data after a first delay increment $D_1$, and continuing until a $(P-1)^{th}$ register receives the data after delay increment $D_{M-1}$ and a $P^{th}$ register receives the data after delay increment $D_M$;

operating the P registers with a single phase clock signal;

comparing signals derived from the P registers in adjacent pairs which are separated at their inputs by successive delay increments $D_1, D_2 \ldots D_{M-1}$, $D_M$ and with the $P^{th}$ register being compared with a signal from the first register, to provide a disagreement signal indicating during which of M+1 time increments a data transition has occurred; and selecting one of two data outputs derived from outputs of two of the P registers as aligned output data.

12. A method as claimed in claim 11, wherein the step of selecting one of two of the P registers comprises selecting from registers separated at their inputs by at least one incremental delay.

13. A method as claimed in claim 12, wherein the step of selecting one of two of the P registers comprises selecting from registers separated at their inputs by at least two incremental delays.

14. A method as claimed in claim 11, wherein the passing step comprises passing the data through M incremental delays where $M \geq 2$ and N stage registers where $N \geq 1$.

15. A method as claimed in claim 11, wherein the passing step comprises passing the data through M incremental delays where $M \geq 3$ and N stage registers where $N \geq 3$.

16. A method as claimed in claim 11, wherein the step of selecting one of two of the P registers comprises selecting from a first and third registers.

17. A method as claimed in claim 11, wherein M=2.

18. A method for aligning the phase of input digital data with respect to a clock signal, comprising steps of;

receiving the input digital data;

passing the received digital data to an N-stage first shift register and to a first delay means having a predetermined first delay and an output;

passing data delayed by the first delay to a second shift register and to a second delay means having a predetermined second delay and an output;

passing the data delayed by the second delay to a third shift register and to a third delay means having a predetermined third delay and an output;

passing the data delayed by the third delay to a fourth shift register;

clocking the received digital data and the received and delayed digital data through first stages of the respective shift registers in response to a single phase clock signal;

identifying which of paired outputs of (i) the first and second shift registers, (ii) the second and third shift registers, (iii) the third and fourth shift registers and (iv) the fourth shift register and an output of the $N-1$ stage of the first shift register, is different; and then selecting as aligned digital data output digital data obtained from the first shift register or another shift register whose output is not different than an adjacent shift register.

19. A method as claimed in claim 18, wherein $N \geq 2$.

20. A method as claimed in claim 18, wherein the steps of passing the data to shift registers comprises passing to N-stage shift registers, wherein $N \geq 3$.

21. A method for aligning the phase of input digital data with respect to a single clock signal, comprising steps of:

providing the input data;

passing the input data through $M \geq 2$ delays $D_1, \ldots D_M$;

deriving at least two output data streams, one from input data not passing through the M delays and at least another from input data passed through one or more of the M delays, the at least two output data streams being temporarily stored in a corresponding number of output registers coupled by a multiplexer to a data output port; and using the single clock signal, selecting among temporarily stored output data streams for delivery to the data output port according to a rule determined by a relative position of a current data transition TR on a phase space representation having $M+1$ sectors $D_1, \ldots D_{M+1}$, the temporarily stored output data streams being identified on the phase space representation at boundaries of the $M+1$ sectors according to which of the temporarily stored output data streams they derive from, wherein the rule comprises:

(i) determining which output data stream is currently selected;

(ii) if a currently selected output data stream does not form a boundary of a phase space sector containing data transition TR, do nothing; or (iii) if the currently selected output data stream forms a boundary of a phase space sector containing data transition TR, then determine which rotational direction around a phase circle one must move in order to go from a current output data stream location to another output data stream location which does not form a boundary of a phase space sector containing the data transition TR without crossing data transition TR; and (iv) if rotation is in a first direction, select earlier data from a temporarily stored another output data stream for delivery to the data output port; or (v) if the rotation is in a second opposite rotational direction, select later data from the temporarily stored another output data stream for delivery to the data output port.

* * * * *

UNITED STATES PATENT AND TRADEMARK OFFICE
CERTIFICATE OF CORRECTION

PATENT NO. : 5,278,873
DATED : January 11, 1994
INVENTOR(S) : Scott William Lowrey et al.

It is certified that error appears in the above-indentified patent and that said Letters Patent is hereby corrected as shown below:

Column 15, claim 9, line 62, change "signal" to --single--.

Signed and Sealed this

Fifteenth Day of November, 1994

Attest:

BRUCE LEHMAN

*Attesting Officer*     *Commissioner of Patents and Trademarks*